US006707473B2

(12) United States Patent
Dresevic et al.

(10) Patent No.: US 6,707,473 B2
(45) Date of Patent: Mar. 16, 2004

(54) DYNAMIC RENDERING OF INK STROKES WITH TRANSPARENCY

(75) Inventors: Bodin Dresevic, Bellevue, WA (US); Michael Kallay, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 217 days.

(21) Appl. No.: 09/918,484

(22) Filed: Aug. 1, 2001

(65) Prior Publication Data

US 2003/0025675 A1 Feb. 6, 2003

(51) Int. Cl.$^7$ .................................................. G09G 5/00
(52) U.S. Cl. ........................ 345/768; 345/764; 345/173
(58) Field of Search ............................... 345/173, 726, 345/764, 768, 592, 634, 637; 178/18.01, 18.03, 18.05, 18.06, 19.01, 19.03, 19.04, 19.05

(56) References Cited

U.S. PATENT DOCUMENTS

| | | | | | |
|---|---|---|---|---|---|
| 4,156,237 A | * | 5/1979 | Okada et al. | ................ | 340/701 |
| 5,509,663 A | * | 4/1996 | Otake et al. | ................ | 273/437 |
| 5,818,456 A | * | 10/1998 | Cosman et al. | ............. | 345/434 |
| 6,201,528 B1 | * | 3/2001 | Lucas et al. | ................ | 345/136 |
| 6,373,490 B1 | * | 4/2002 | Bendiksen et al. | ......... | 345/441 |

OTHER PUBLICATIONS

James D. Foley, et al., "Computer Graphics: Principles and Practices", $2^{nd}$ Edition, 1990, pp. 835–840.
Gerald E. Farin, "Curves and Surfaces for Computer Aided Geometric Design a Practical Guide", $2^{nd}$ Edition, 1990, pp. 37–41.
Angelfire Webpage, "Curve Fitting and the Method of Least Squares", http://www.angelfire.com/ak4/neurope/ls.html, printed Jul. 6, 2001,13 pages.
John D. Hobby, "Rasterizing Curves of Constant Width", Journal of the Association for Computing Machinery, vol. 36, No. 2, Apr. 1989, pp. 209–229.

* cited by examiner

*Primary Examiner*—Vijay Shankar
*Assistant Examiner*—Tommy Sheng
(74) *Attorney, Agent, or Firm*—Banner & Witcoff, Ltd.

(57) ABSTRACT

Apparatus and methods for dynamically rendering transparent ink strokes, in some situations such that the rendered ink stroke has transparency similar to physical ink while it is being drawn. For example, the ink stroke may be dynamically rendered as a stroke having uniform transparency while it is being drawn. Only the new ink segment that has most recently been added to the stroke may be drawn, and areas of the new ink segment that overlap older segments of the ink stroke may be frozen, or excluded from being re-painted.

24 Claims, 16 Drawing Sheets

DYNAMIC RENDERING OF INK STROKES WITH TRANSPARENCY

CROSS-REFERENCE TO RELATED APPLICATIONS

This application is related to U.S. patent application Ser. No. 09/918,721, entitled "Rendering Ink Strokes of Variable Width and Angle," filed simultaneously with the present application, and U.S. patent application Ser. No. 09/852,799, entitled "Serial Storage of Ink and its Properties", filed May 11, 2001, both hereby incorporated by reference as to their entireties.

FIELD OF THE INVENTION

The present invention is directed generally to rendering transparent digital ink, and more particularly to improved ways of rendering transparent digital ink dynamically.

BACKGROUND OF THE INVENTION

The term "digital ink" refers to one or more strokes that are recorded from a pointing device, such as a mouse, a stylus/pen on a digitizer tablet, or a stylus/pen on a display screen integrated with a digitizer tablet (e.g., a touch-sensitive display screen). As used herein, the term "ink" is shorthand for digital ink. Also, the term "pen" and "stylus" are used generically and interchangeably. Each stroke may be stored as one or more ink packets, in which each ink packet may contain coordinates (x, y) corresponding to the position of the pointing device. For example, a user may move a pen along a touch-sensitive display screen of a computer system so as to draw a line or curve, and the computer system may sample the coordinates (x, y) along the trajectory of the pen tip position over time (or on any other interval as known in the art) as the user moves the pen. These coordinates represent points along the curve or line and are stored as ink packets.

Ink may be either transparent or non-transparent, as used herein. Ink that is transparent means that the ink does not fully conceal the background behind it when displayed on a display or printed on a printer. Ink that is not transparent completely conceals or occludes the background behind it. Non-transparent ink may also be referred to as opaque ink. For instance, FIG. 1 shows ink strokes 101, 102, and 103. Ink strokes 102 and 103 each overlay ink stroke 101, but ink stroke 103 completely conceals its background, including the portion of ink stroke 101 that it overlays (i.e., the portion of ink stroke 101 that is a background behind ink stroke 103). Thus, ink stroke 103 is considered opaque. In contrast, ink stroke 102 allows some of ink stroke 101, as well as some of the white background, to show through where ink stroke 102 overlays ink stroke 101. Thus, ink stroke 102 is considered transparent. Ink can be of any transparency and still be considered transparent. Current graphics interfaces are capable of applying transparent paint with a prescribed degree of transparency. For example, ink may be 50% transparent, which means that 50% of the background is concealed, or ink may be 25% transparent, which means that 75% of the background is concealed. A transparent ink stroke can be analogized with a piece of glass, such as colored glass, in which objects behind the glass can be seen. A non-transparent ink stroke can be analogized with a brick wall that hides everything behind it.

It is often desirable to render a transparent ink stroke dynamically while the ink stroke is being drawn, in other words, to draw the ink stroke on the display screen while the pointing device moves and adds new points to the ink stroke or strokes. One way to accomplish this is to erase the entire screen and redraw everything on the screen each time a new point is added to the ink stroke. This is an imperfect solution, however, since in practice there is typically a short time interval between ink points, and repeatedly clearing and redrawing the screen uses massive amounts of processing power, not to mention causing the screen to flicker. A way to reduce the redrawing time would be draw each new segment of an ink stroke as it is drawn. The problem with this is that the transparencies of the overlapping portion of ink segments are reduced in an unexpected and unintended manner. The effect of redrawing transparent ink is shown in FIG. 2, where the darker circles of an ink stroke 200 represent the overlapping start and end points of the segments. These overlapping areas are darker because they are each drawn twice—once when a segment ending with a particular point is drawn, and again when the next segment beginning with the same point is drawn—thereby reducing the transparency at the overlap. The result is an unintentionally non-uniform ink stroke. This is analogous to repeatedly making a glass window thicker, thereby making objects on the other side of the glass more difficult to see by making the window darker. The variable transparency of the rendered ink is unexpected to the user who would expect transparent ink to be rendered as transparent physical ink as applied to paper and/or over other ink.

There is also a need for providing various artistic features not provided by current systems, such as dynamically rendering ink responsive to variable width, pressure, speed, and angle of the pen.

SUMMARY OF THE INVENTION

Apparatus and methods are disclosed for dynamically rendering transparent ink strokes that solves at least one of the problems associated with rendering transparent ink. Using the present invention, the rendering of electronic ink (or ink as used herein) is improved. For example, the ink stroke may be dynamically rendered as a stroke having uniform transparency while it is being drawn. This may be performed without having to clear and redraw the entire screen.

To dynamically draw a transparent ink stroke, a computer system may draw only the segment that has most recently been added to the stroke. The system may further exclude areas of the new segment that overlap older portions of the stroke from being painted more than once, which would otherwise make the older segments less transparent. For instance, the color settings of pixels in the overlapping areas may be frozen before painting the new segment. Freezing the color settings may reduce or prevent unintended non-uniformities in the ink stroke.

These and other features of the invention will be apparent upon consideration of the following detailed description of preferred embodiments. It will be apparent to those skilled in the relevant technology, in light of the present specification, that alternate combinations of aspects of the invention, either alone or in combination with one or more elements or steps defined herein, may be used as modifications or alterations of the invention or as part of the invention. It is intended that the written description of the invention contained herein covers all such modifications and alterations.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention. In the accompanying drawings, elements are labeled with reference numbers, wherein the first digit of a three-digit reference number, and the first two digits of a four-digit reference number, indicates the drawing number in which the element is first illustrated. The same reference number in different drawings refers to the same or a similar element.

DETAILED DESCRIPTION OF EXEMPLARY EMBODIMENTS

Improved transparent ink rendering systems and methods are disclosed. The various embodiments of the invention are described in the following sections: General Purpose Computing Environment, Ink Rendering System, and Ink Smoothing.

General Purpose Computing Environment

Figure 1:
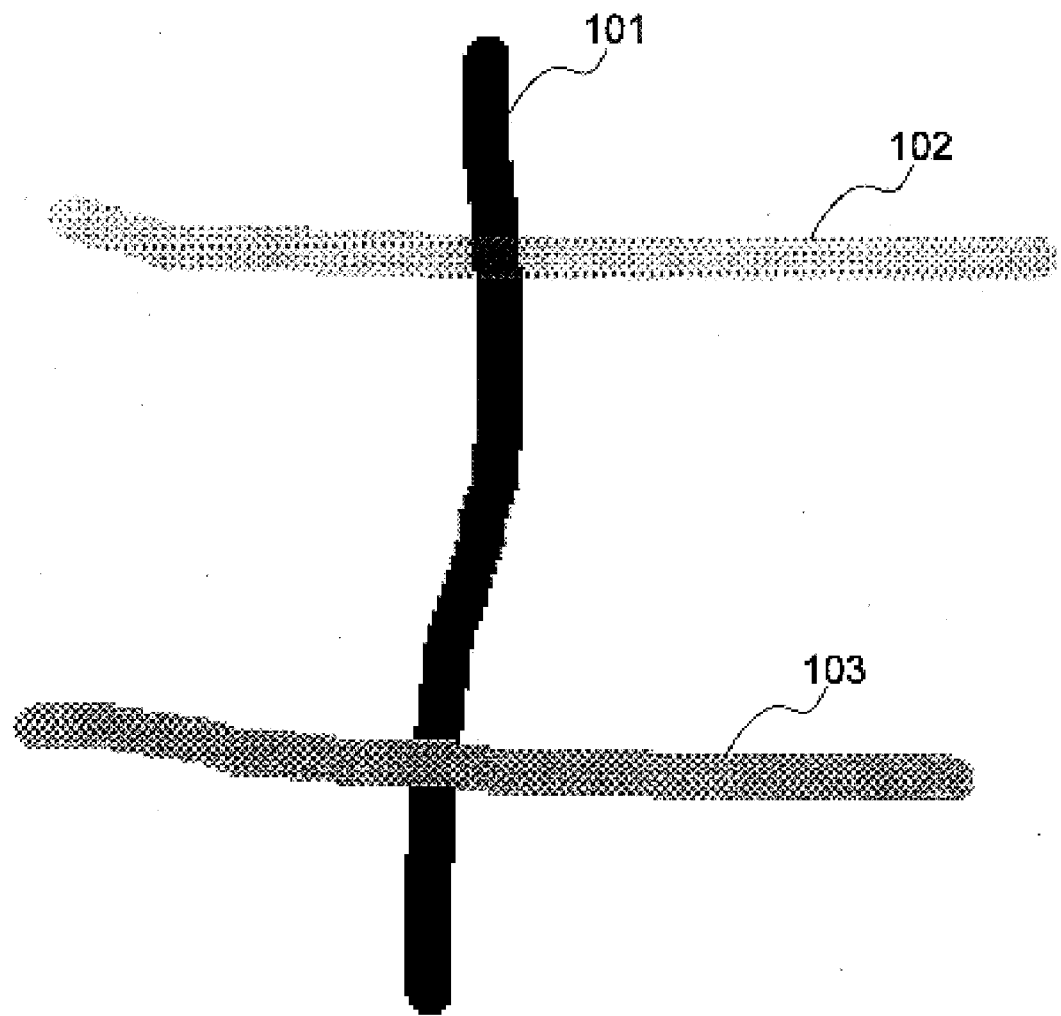
FIG. 1 is an exemplary embodiment of both transparent and non-transparent digital ink as they may be displayed, according to at least one aspect of the present invention.
Figure 2:
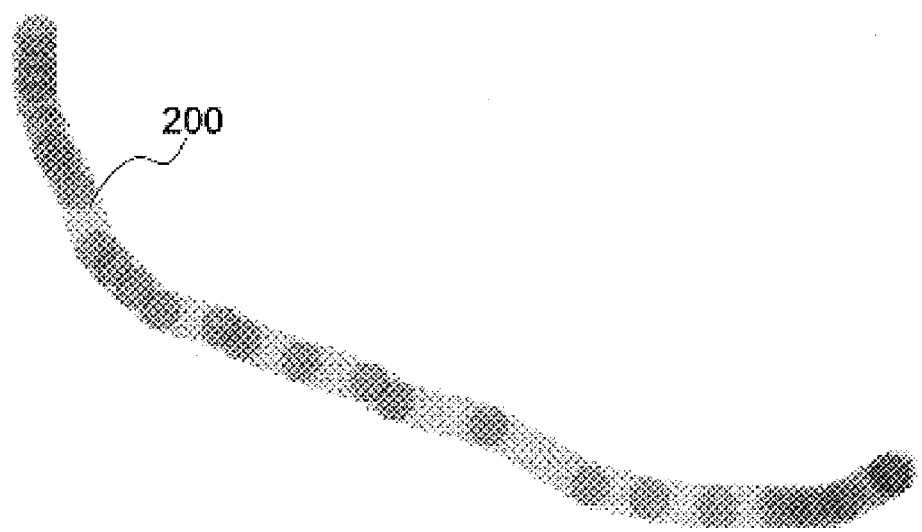
FIG. 2 is an exemplary embodiment of transparent digital ink as it may be displayed, showing non-uniformities due to blending of multiple segments.
Figure 3:
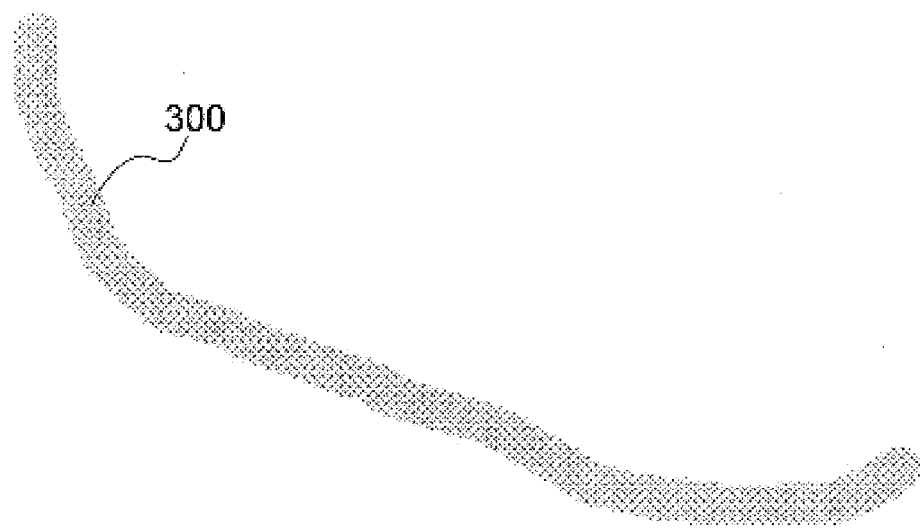
FIG. 3 is an exemplary embodiment of transparent digital ink as it may be displayed, without the non-uniformities of the ink shown in FIG. 2, and according to at least one aspect of the present invention.
Figure 4:
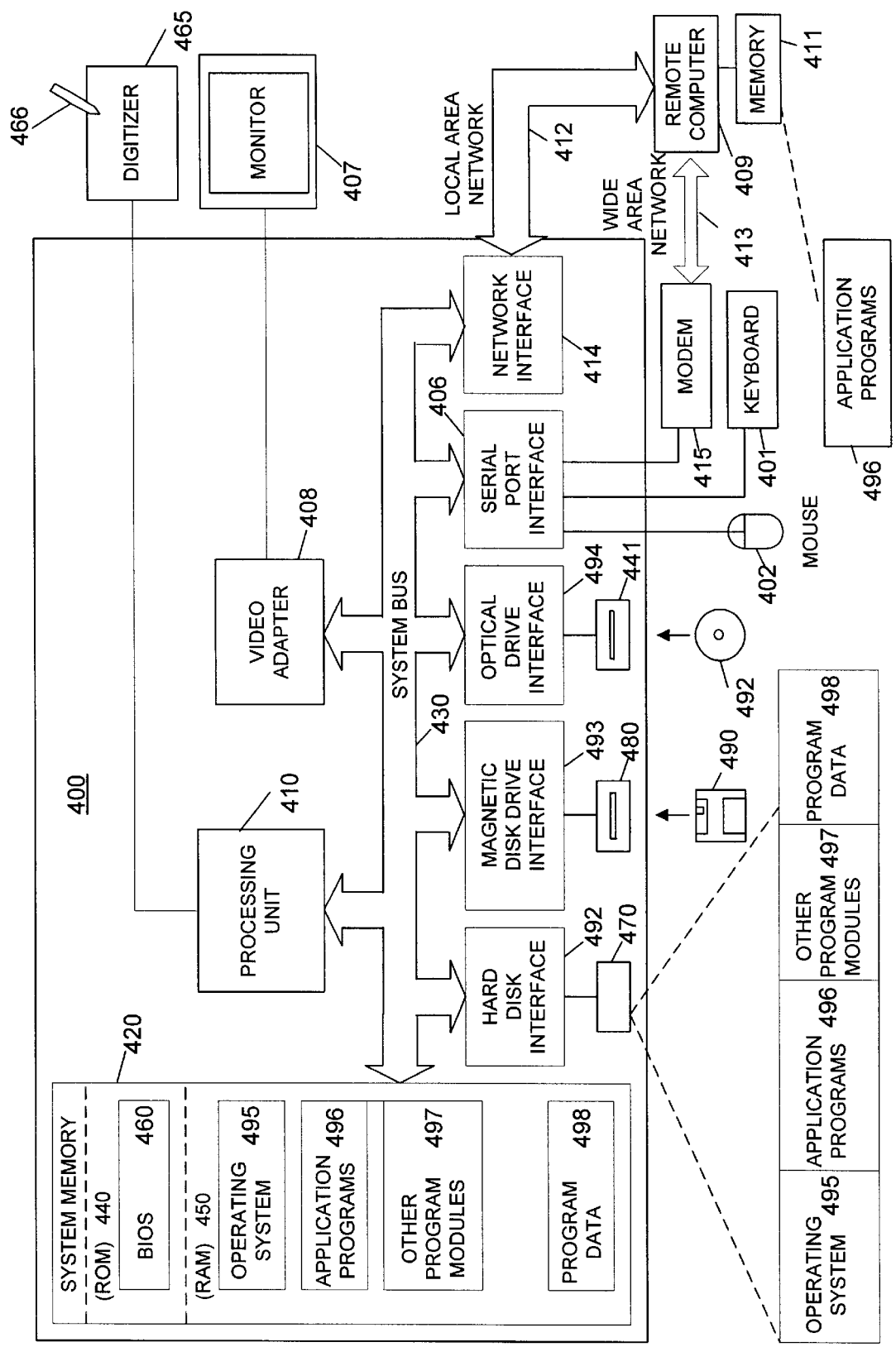
FIG. 4 is a functional block diagram of an exemplary embodiment of a computer system according to at least one aspect of the present invention.

FIG. 4 illustrates a schematic diagram of an exemplary general-purpose digital computing environment that may be used to implement various aspects of the present invention. In FIG. 4, a computer 400 such as a personal computer includes a processing unit 410, a system memory 420, and/or a system bus 430 that couples various system components including the system memory to processing unit 410. System bus 430 may be any of several types of bus structures including a memory bus or memory controller, a peripheral bus, and a local bus using any of a variety of bus architectures. System memory 420 includes read only memory (ROM) 440 and random access memory (RAM) 450.

A basic input/output system 460 (BIOS), containing the basic routines that help to transfer information between elements within computer 400, such as during start-up, is stored in ROM 140. The computer 400 also includes a hard disk drive 470 for reading from and writing to a hard disk (not shown), a magnetic disk drive 480 for reading from or writing to a removable magnetic disk 490, and an optical disk drive 491 for reading from or writing to a removable optical disk 492 such as a CD ROM or other optical media. Hard disk drive 470, magnetic disk drive 480, and optical disk drive 491 are connected to the system bus 430 by a hard disk drive interface 492, a magnetic disk drive interface 493, and an optical disk drive interface 494, respectively. The drives and their associated computer-readable media provide nonvolatile storage of computer readable instructions, data structures, program modules and other data for personal computer 400. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on hard disk drive 470, magnetic disk 490, optical disk 492, ROM 440, and/or RAM 450, including an operating system 495, one or more application programs 496, other program modules 497, and program data 498. A user can enter commands and information into computer 400 through input devices such as a keyboard 401 and pointing device 402. Other input devices (not shown) may include a microphone, joystick, game pad, satellite dish, scanner or the like. These and other input devices are often connected to processing unit 410 through a serial port interface 406 that is coupled to the system bus, but may be connected by other interfaces, such as a parallel port, game port or a universal serial bus (USB). Further still, these devices may be coupled directly to system bus 430 via an appropriate interface (not shown). A monitor 407 or other type of display device is also connected to system bus 430 via an interface, such as a video adapter 408. In addition to the monitor, personal computers typically include other peripheral output devices (not shown), such as speakers and printers. In one embodiment, a pen digitizer 465 and accompanying pen or stylus 466 are provided in order to digitally capture freehand input. Although a direct connection between pen digitizer 465 and processing unit 410 is shown, in practice, pen digitizer 465 may be coupled to processing unit 410 via a serial port, parallel port, and/or other interface and system bus 430 as known in the art. Furthermore, although digitizer 465 is shown apart from monitor 407, in some embodiments the usable input area of digitizer 465 be co-extensive with the display area of monitor 407. Further still, digitizer 465 may be integrated in monitor 407, or may exist as a separate device overlaying or otherwise appended to monitor 407.

The computer 400 can operate in a networked environment using logical connections to one or more remote computers, such as a remote computer 409. Remote computer 409 can be a server, a router, a network PC, a peer device or other common network node, and typically includes many or all of the elements described above relative to computer 400, although only a memory storage device 411 has been illustrated in FIG. 4. The logical connections depicted in FIG. 4 include a local area network (LAN) 412 and a wide area network (WAN) 413. Such networking environments are commonplace in offices, enterprise-wide computer networks, intranets and the Internet.

When used in a LAN networking environment, the computer 400 is connected to local network 412 through a network interface or adapter 414. When used in a WAN networking environment, the computer 400 typically includes a modem 415 or other device for establishing a communications over wide area network 413, such as the Internet. Modem 415, which may be internal or external, is connected to system bus 430 via the serial port interface 406. In a networked environment, program modules depicted relative to the computer 400, or portions thereof, may be stored in a remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Ink Rendering System

Figure 5:
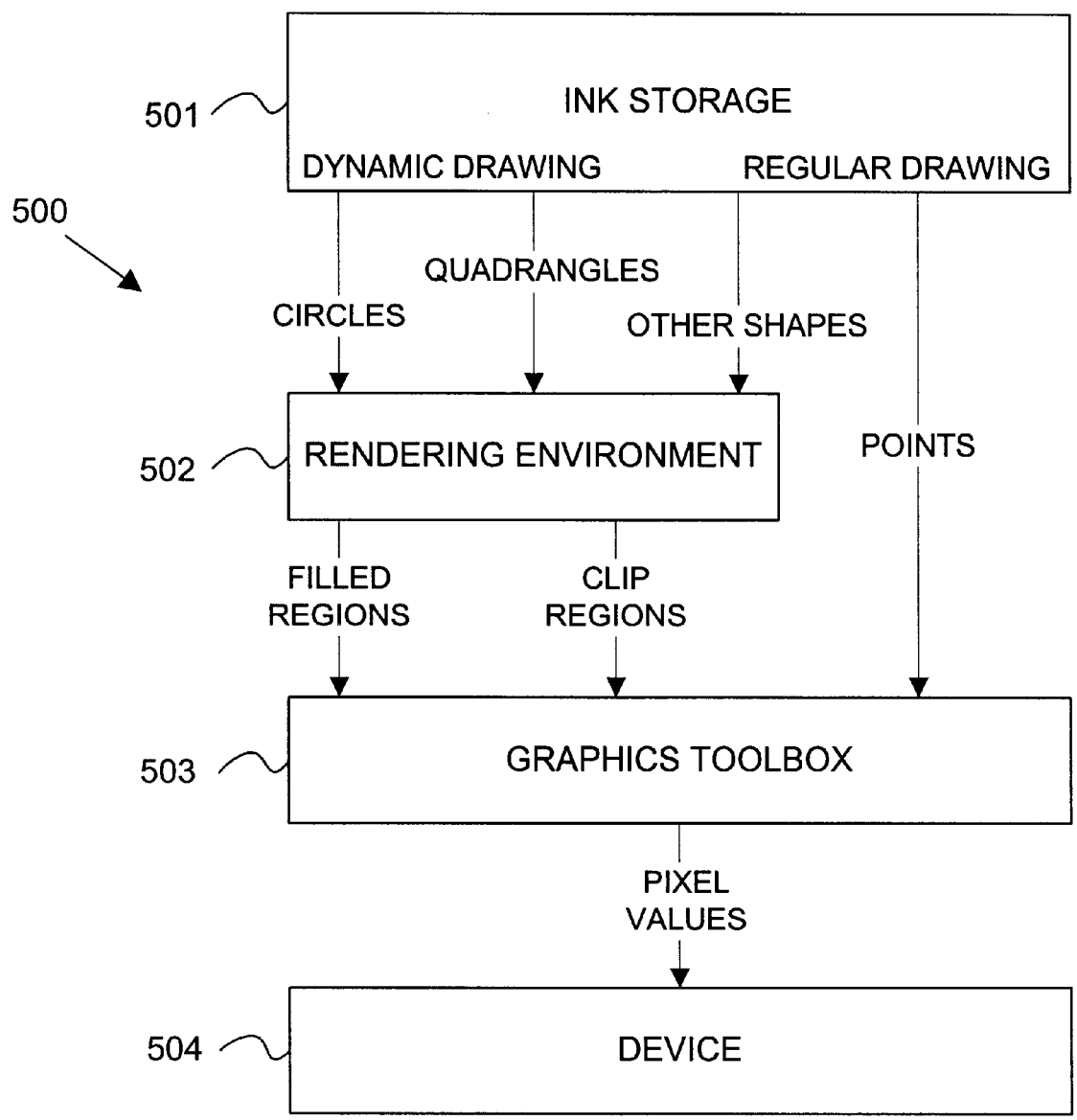
FIG. 5 is a functional block diagram of an exemplary embodiment of an ink rendering system according to at least one aspect of the present invention.

An exemplary ink rendering system 500 is illustrated in FIG. 5. Some or all of the ink rendering system 500 may be software, hardware, and/or firmware, and may be a part of the computer system 400 or a separate unit. For instance, some or all of the ink rendering system 500 may be embodied as computer code stored in the RAM 450 as part of the operating system 495, an application program 496, and/or another program module 497. The ink rendering system 500 may include an ink storage 501 coupled to a rendering environment 502, which in turn may be coupled to a graphics toolbox 503, which in turn may be coupled to an output device 504 such as a display screen (e.g., monitor 407) and/or printer. The ink storage 501 may include information relating to ink including a file structure having data points representing points of the ink. The file structure may also include alternatively (or in addition to the data points) other ways to represent the ink including vectors between points, data points, stroke width information, and/or any other ink storage scheme.

Stored ink may be rendered by calling the graphics toolbox 503 to perform various functions. The ink storage 501 may maintain a list of rendering environments, one for each view in which the application renders dynamically. Each rendering environment may maintain a list of the states, one for each stroke that is currently being dynamically rendered. Each state may represent the last pen tip position (e.g., point) recorded and/or a queue of geometric regions that are further described below. In at least one embodiment, the graphics toolbox 503 has transparent painting capabilities, such as does Microsoft WINDOWS GDI+.

Figure 6:
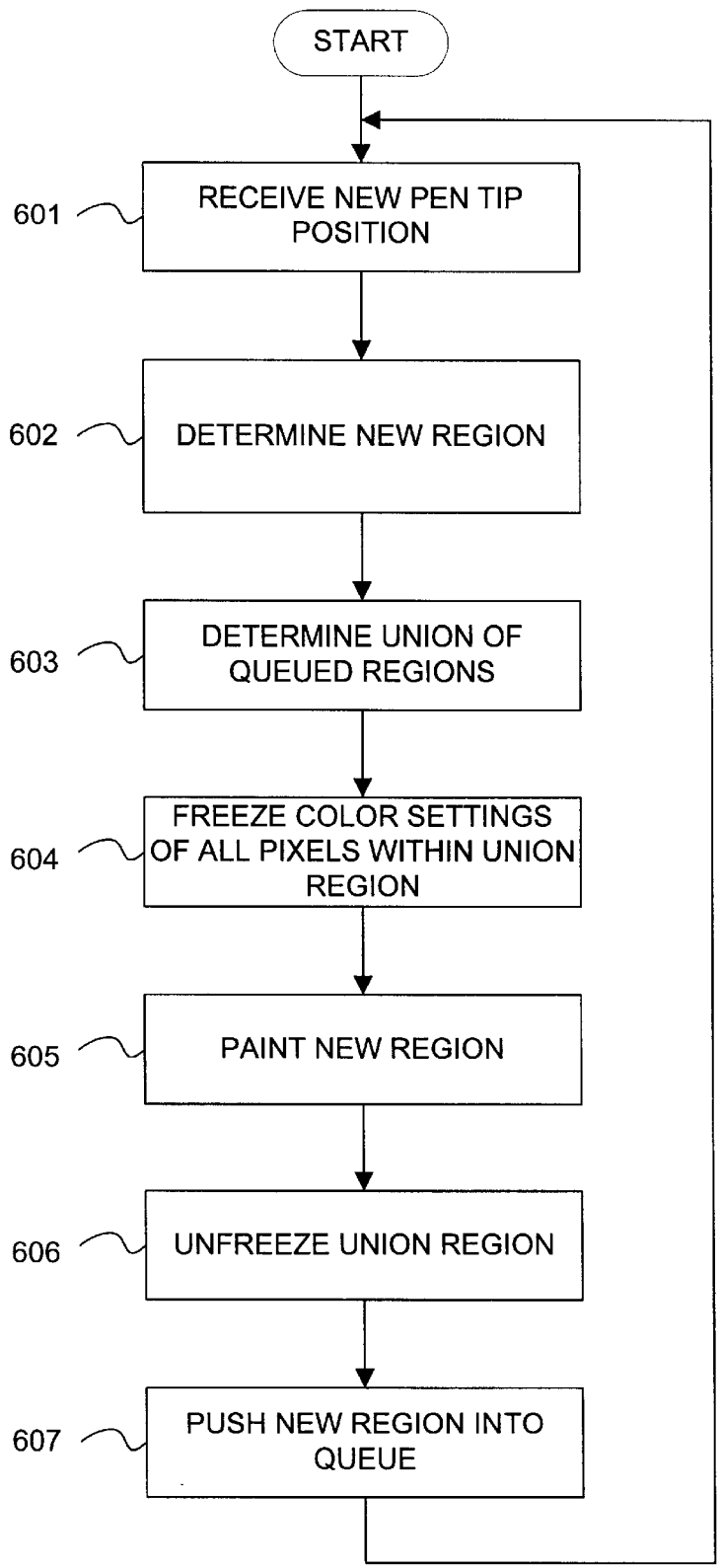
FIG. 6 is an exemplary flowchart showing steps that may be performed in order to render transparent ink according to at least one aspect of the present invention.

FIG. 6 illustrates an example of the operation of the ink rendering system 500. When a user draws a stroke, the ink rendering system 500 may receive a new pen tip position (step 601). More particularly, the ink storage 501 may receive the new pen tip position. Pen tip positions may be sampled and determined according to the position of the stylus 466 upon the digitizer 465. Pen tip positions may further be determined according to the position of the stylus 466 within a known input window or area that defines a portion of the digitizer 466 surface. For instance, where the digitizer 465 and the monitor 407 are combined or co-extensive, there may be a predefined window displayed on the digitizer 465 within which input from the stylus 466 may be accepted, e.g., for drawing an object and/or for entering text.

Figure 7:
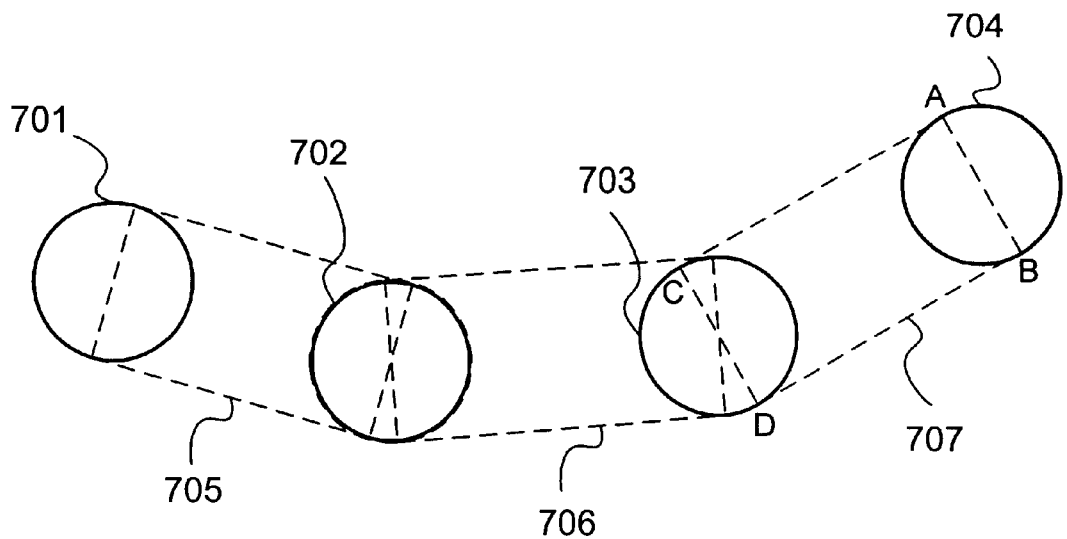
FIG. 7 is an exemplary geometrical representation of stroke segments including circular pen tip instances and connecting quadrangles according to at least one aspect of the present invention.
Figure 8:
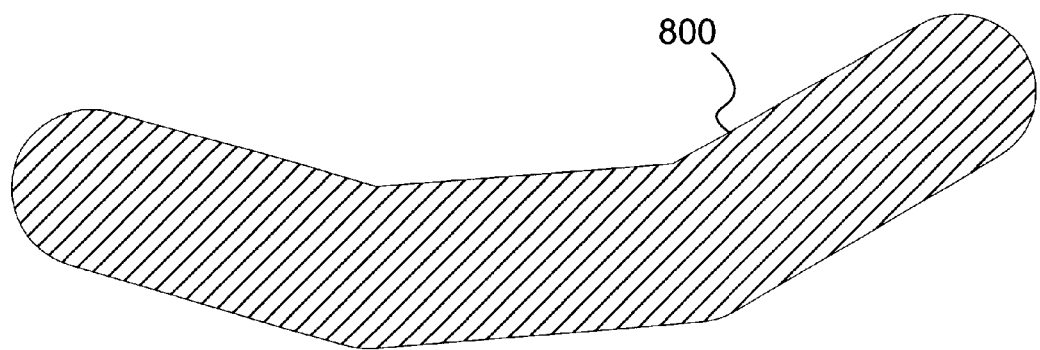
FIG. 8 is an exemplary embodiment of digital ink corresponding to the stroke segments of FIG. 7 as it may be displayed, according to at least one aspect of the present invention.

Pen tip positions may be sampled at a particular rate. The sampling rate may be set at a rate at least high enough to capture sufficient pen tip positions based on the anticipated speed of a normal user. Once the new pen tip position is captured and received, the ink rendering system 500 (e.g., in particular, the ink storage 501) may determine the area (and/or the contour that outlines and defines the area) that is associated with the pen tip at the new position based on the size and/or shape of the virtual pen tip. This area is also known as a "pen tip instance." For example, where the virtual pen tip is considered to be a 3-millimeter diameter circle, then the pen tip instance may be the 3-millimeter diameter circle centered at the new pen tip position. Or, where the virtual pen tip is considered to be a rectangle of 2 millimeters by 4 millimeters, then the pen tip instance may be the 2 by 4 millimeter rectangle centered at the new pen tip position. Examples of circular pen tip instances 701, 702, 703, 704 are shown in FIG. 7. The size and shape of the pen tip instance are considered properties of the pen tip position. Where the entire stroke has the same size and/or shape, then the size and/or shape may be a property of the entire stroke as opposed to each pen tip position. Of course, any shape may be used for a pen tip. Circular pen tip instances are used here for simplicity.

Each time a pen tip instance is determined, that pen tip instance (and/or the associated pen tip position) may be stored for later retrieval. Pen tip instances and/or positions may be stored as data in, e.g., RAM 450. Data representing the position (e.g., (x, y) coordinate position), shape, and/or rotation of the pen tip instance may further be stored. Previous pen tip instances and/or positions may further be stored as part of digital ink storage such as in the serialized format described in U.S. patent application Ser. No. 09/852, 799, entitled "Serial Storage of Ink and its Properties", filed May 11, 2001, both hereby incorporated by reference as to their entireties.

Referring still to FIG. 6, the ink rendering system 500 may render an ink segment that connects between the previous pen tip instance and a new pen tip instance in an ink stroke. To do so, the ink rendering system 500 may compute the new pen tip instance and/or one or more connecting quadrangles that connect between the new pen tip instance and a previous pen tip instance (step 602). Both the pen tip instances and the connecting quadrangles are referred to herein as "regions."

The new pen tip instance is associated with the new pen tip position, and may be centered about the new pen tip position. The new connecting quadrangle may be determined in a variety of ways, and the method for determining the connecting quadrangle may depend upon the shapes of the new and previous pen tip instances. Various methods for determining connecting quadrangles will be discussed herein. Examples of connecting quadrangles 705, 706, 707 are shown in FIG. 7. A new region may be defined as the new pen tip instance, the new connecting quadrangle, or the combination (e.g., union) of the new pen tip instance and the new connecting quadrangle. For example, the new region may be pen tip instance 704, connecting quadrangle 707, or the union of pen tip instance 704 and connecting quadrangle 707. Conventional graphics toolboxes are capable of performing such a combination/union when provided with the shapes to be combined. In alternative embodiments, more than one new pen tip instance and/or new connecting quadrangle may be the new region. For instance, two consecutive new pen tip instances and their two corresponding new connecting quadrangles may be all unioned together as the new region. In this way, the method of FIG. 6 does not necessarily need to be performed between each and every pen tip instance.

The combination (e.g., union) of some or all of a plurality of previous regions may also be determined (step 603). These previous regions may be stored in a queue. A queue is an ordered list of items and is of a fixed, dynamic, maximum, or other controlled length. For example, a queue may have a maximum enforced length of 2, 3, or 4 items, although any length may be used. The queue may be configured as a first-in-first-out (FIFO) type queue, as in a pipeline. Where the maximum length of the FIFO queue is surpassed by adding another item to the queue, the oldest item is pushed out of the queue. The queue may separately store the actual items, or may have pointers that point to the items stored elsewhere. Where the items are stored elsewhere, they may be stored in a serialized or other format. In alternative embodiments, the items in the queue may be any items of data that represent some or all of the characteristics of pen tip positions and/or connecting quadrangles. In still further embodiments, each item in the queue may be a combined pen tip position and connecting quadrangle.

Figure 9:
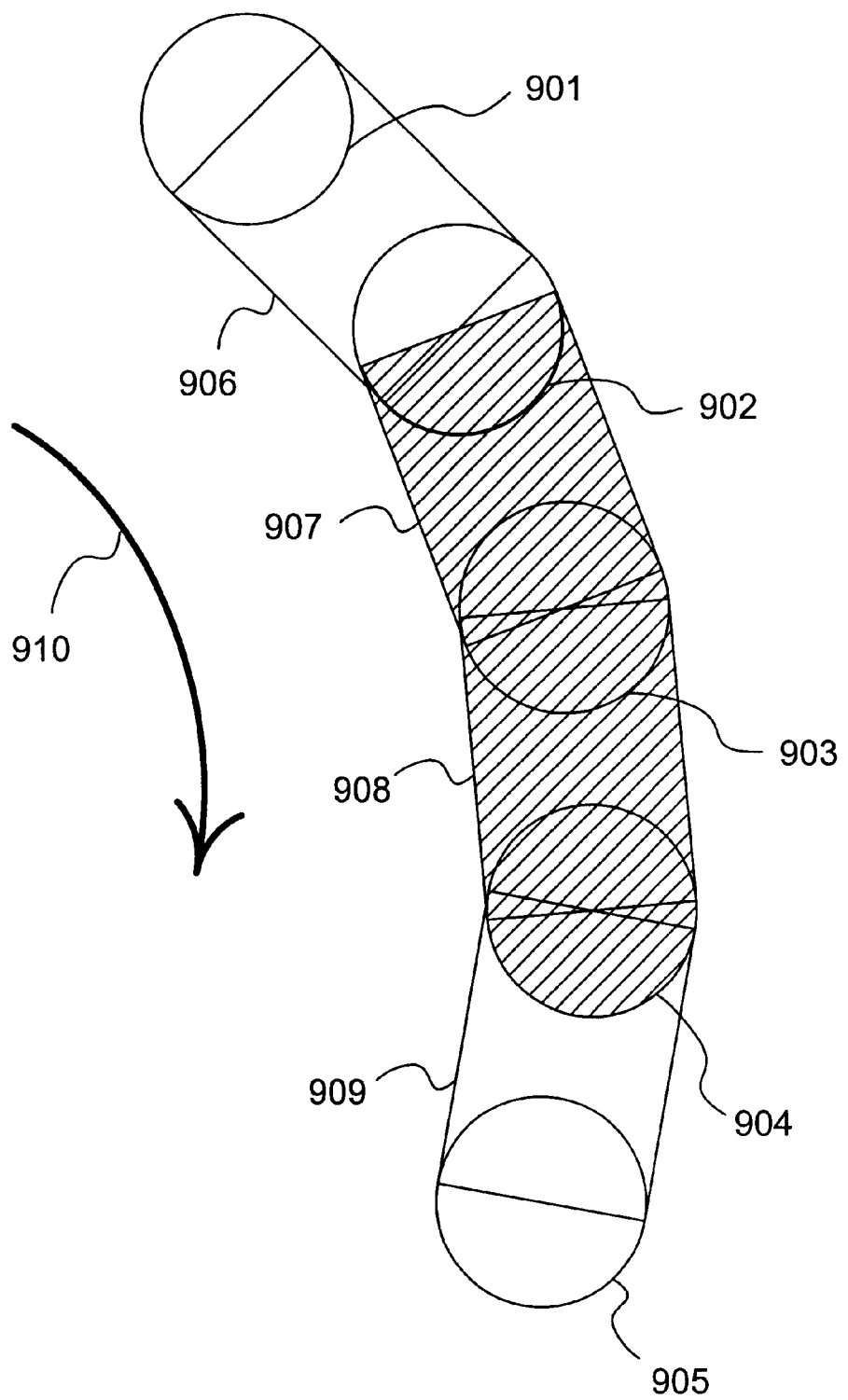
FIG. 9 is an exemplary geometrical representation of a frozen region within a series of stroke segments, according to at least one aspect of the present invention.

For example, referring to FIG. 9, where the new pen tip instance is pen tip instance 905, the new connecting quadrangle is connecting quadrangle 909, and the queue has a maximum length of 4 regions, the queued regions to be combined may be pen tip instances 903, 904 (two regions) and connecting quadrangles 907, 908 (two more regions, for a total of four regions). The union of these queued regions is shown as the shaded area in FIG. 9. The arrow 910 indicates the direction of movement of the pen tip, such that the pen tip instance 905 is the most recent and the pen tip instance 901 is the earliest in time. Note that although connecting quadrangle 906 and pen tip instance 901 may have been in the queue at an earlier time, these two regions were later pushed out of the queue due to the enforcement of its maximum length.

The ink rendering system 500 (in particular, e.g., the rendering environment 502) may freeze the color settings of the pixels (step 604) within the region defined by the combination (e.g., union) of the queued regions (e.g., the shaded area in FIG. 9). The combined queued regions thus become an excluding clip region that may be sent to the graphics toolbox 503. Freezing the color settings means preventing the color and intensity of the pixels from changing. Thus, any further attempts at painting the frozen pixels will have no effect on the color and intensity of the frozen pixels. This is important where the colors are transparent, since the new connecting quadrangle (e.g., quadrangle 909) is likely to overlap with the union of the queued regions (e.g., the shaded area in FIG. 9). Without freezing the pixels in the queued regions, the overlapping portion will undergo a change in transparency when the new regions are painted. Conventional graphics toolboxes are capable of freezing the color settings of a group of pixels. An alternative to determining the union of the queued regions and then freezing the determined union region is to simply freeze each of the queued regions individually. This alternative provides the benefit of avoiding the step of determining the union. However, it increases the number of regions that need to be sent to the graphics toolbox for freezing.

The new region may be sent to the graphics toolbox 503 for painting (step 605). The new region may be painted in a transparent or nontransparent color as desired. After the new regions are painted, some or all of the pixels in the excluding clip region may be unfrozen (step 606). This step allows the color settings of the formerly frozen pixels to again be modified. More generally, the ink rendering system 500 may determine whether pixels within the new pen tip instance and/or new connecting quadrangle are also within the previous regions (such as those regions in the queue). For those pixels that are, the color settings of those pixels may not be changed. For those pixels that are in the new pen tip instance but not within any of the previous queued regions, the color settings may be changed.

The new region (e.g., connecting quadrangle 909) may then be pushed into the queue (step 607). Where the queue has rules that determine the queue length, one or more of the oldest regions may be pushed out of the queue as appropriate according to the queue rules. For example, referring to FIG. 9, a queue having a maximum of 4 regions may currently contain the following regions in the following order:907, 903, 908, and 904 (wherein 904 is the oldest). When connecting quadrangle 909 (in this example, the new region) is pushed into the queue, then region 907 is pushed out the queue in order to maintain no more than 4 regions within the queue. Thus, the new queue would contain regions 903, 908, 904, and 909 (in that order, with 903 being the oldest and 909 being the newest). The queue may have any maximum length, such as 1 region, between 2 and 4 regions inclusive, between 5 and 10 regions inclusive, or between 10 and 20 regions inclusive, 10 and 100 regions inclusive, or more. If the queue length is too short, then it is likely that a new pen tip instance from a slow-moving pen may overlap a region recently dropped from the queue, resulting in an unintended decrease in transparency in the overlapping area. This results in an unexpected rendering of ink. However, as processing time increases with queue length, using a long queue length may require the system to group numerous regions, objects, or shapes, thereby slowing the system during the rendering process and/or requiring higher processor speed to maintain adequate representation of ink in real-time.

Figure 21:
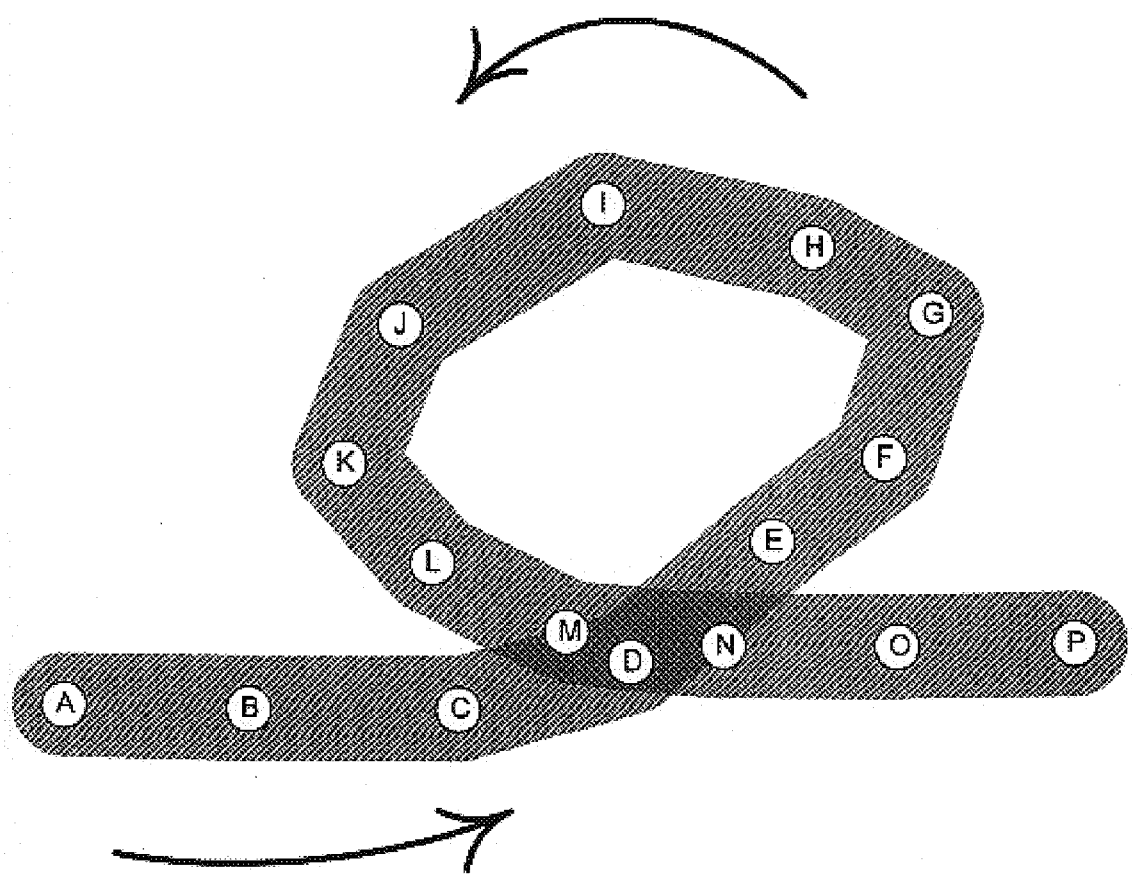
FIG. 21 is a representation of a rendered exemplary ink stroke according to at least one aspect of the present invention.

Further, a queue length that is allowed to be too long may prevent certain desirable overlapping of transparent ink, such as when writing the script letter "e" as in FIG. 21. For example, if the queue length were long enough to include all of points A through P of FIG. 21, then the overlapping as shown would not occur since all of the pixels in the shown segments would be part of the excluding clip region. But if the maximum queue length were set to, e.g., 4 regions, then at point M, as the overlap begins to occur, the queue would contain only the regions of the connecting region between L and M, the region defined by the pen tip instance at point L, the connecting region between K and L, and the pen tip instance at point K. In such a case, the portion of the ink to be overlapped would not be part of the excluding clip region. It is thus desirable to use a queue length that balances the above considerations. For example, a queue with a length of 4 regions is a reasonable compromise between quality and speed for a digitizer having a resolution of about 12,000 by 9,000 pixels with a sampling rate of about 130 samples per second. The maximal queue length may depend upon the resolution of the input digitizer, the display resolution, the sampling rate, the pen speed, user settings, application settings, and/or other considerations. For instance, a larger maximal queue length may be desirable with a higher digitizer resolution and/or a higher sampling rate.

The exemplary method of FIG. 6 may be repeated for each new region. Following the example discussed above, after the new region 909 is pushed into the queue, the method of FIG. 6 may be practiced where the new region is pen tip instance 905. Once pen tip instance 905 is painted in step 605 and the excluding clip region is unfrozen in step 606, then the pen tip instance 905 may be pushed into the queue and pen tip instance 903 may be pushed out of the queue. This results in the queue containing regions 908, 904, 909, and 905.

As an alternative to determining the union of the queued regions and/or freezing the pixels in the union, the intersection (i.e., overlap) between the new region and one or more of the queued regions may be determined. Instead of freezing the entire union of the queued regions, it may be desirable to freeze only those pixels in the intersection. For instance, where connecting quadrangle 909 is the new region, the intersection between the new region and the union of regions 907, 903, 908, and 904 may be determined (as an alternative to step 603), and only those pixels in the intersection would be frozen (as an alternative to step 604).

It is understood that one or more of the steps illustrated in FIG. 6 may be performed in a different order, combined with another step(s), and/or divided into further sub-steps as appropriate. For example, step 603 may be performed prior to step 602 or even prior to step 601. Also, while embodiments of the present invention are described with the connections between pen tip instances being line segments, it is appreciated that the ink between the pen tip instances do not have to be actual line segments or quadrilaterals. The ink may include groupings of triangles, be bowed in shape, or assume a variety of shapes. One example of using curved lines is the advantage of being able to provide a degree of smoothing to an ink stroke.

The generation of connecting quadrangles is now discussed. Referring to FIG. 7, a particular exemplary ink stroke may include four circular pen tip instances 701, 702, 703, 704, and three connecting quadrangles 705, 706, 707. Connecting quadrangle 707 (for example) has four corners A, B, C, D, and four sides. The notation for an edge will refer to the end points of the edge. Thus, for example, the edge between corners A and B will be referred to as edge (or line or chord) AB.

The calculations for determining a connecting quadrangle may vary depending upon the relative shapes and sizes of the pen tip instances. Where the pen tip instances are both perfectly circular and of the same size, as in FIG. 7, the connecting quadrangle 707 that connects pen tip instance 703 and 704 may be defined by lines AC, BD that are tangent to the outer edges of both pen tip instances, closed by the chords AB, CD that connect them. Note that in this example where the pen tip instances are of the same size and are circular, the chords AB, CD each defines the geometric diameter of its respective pen tip instance. Also note that in this example, the connecting quadrangles are each rectangles with orthogonal sides. However, as will be seen in further examples, the connecting quadrangles are not necessarily rectangles. They may be any type of quadrangle such as parallelograms and trapezoids.

Figure 10:
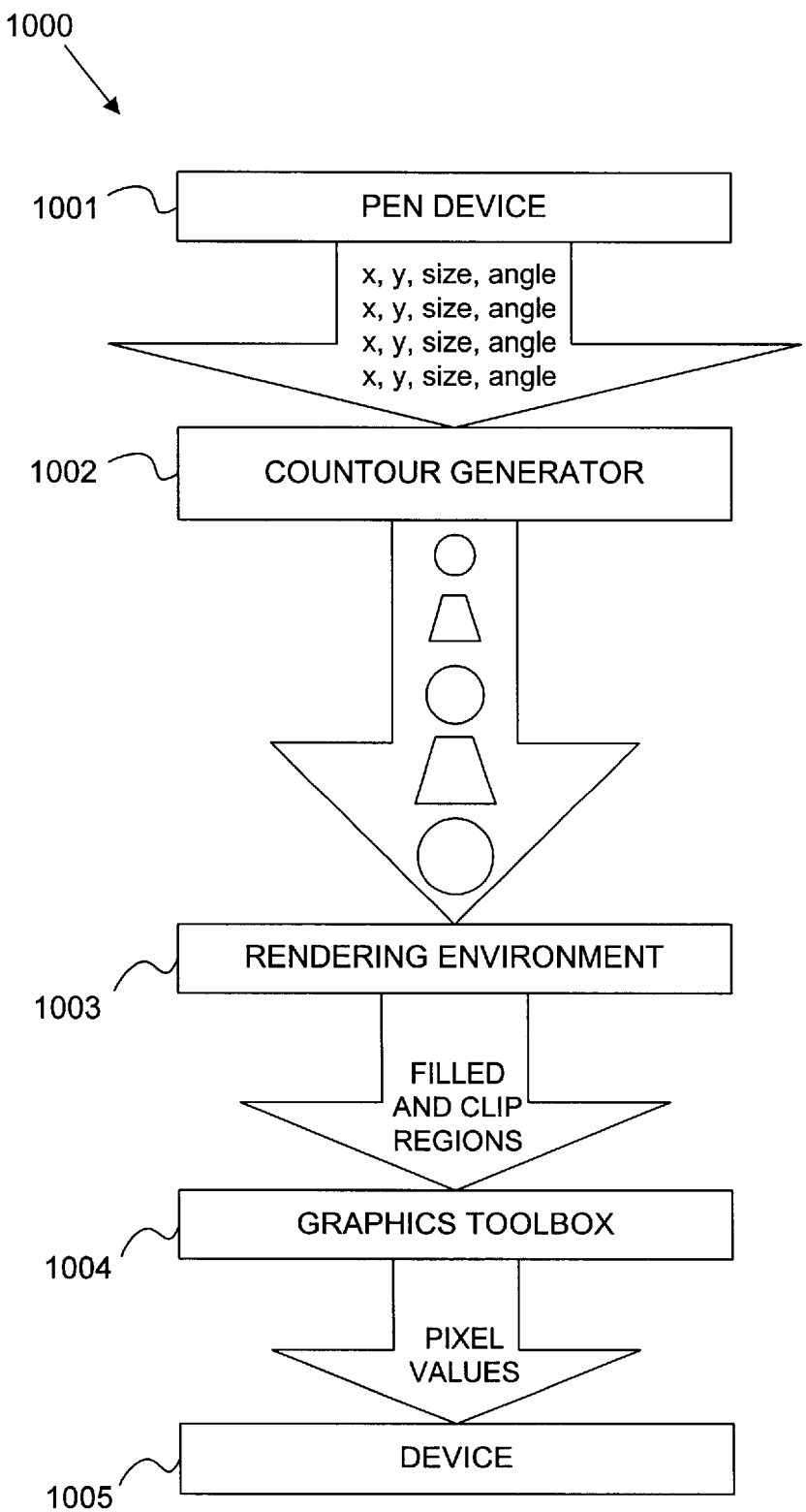
FIG. 10 is a functional block diagram of an exemplary embodiment of another ink rendering system according to at least one aspect of the present invention.

Thus far the exemplary pen tip instances have all been identically sized circles. However, this is not always the case. Pen tip instances may be of any shape, such as circles, rectangles (including squares), triangles, ovals, blobs, stars, lines, arcs, points, or polygons. Pen tip instances may be symmetric or asymmetric. An example of an asymmetric pen tip instance is one configured to emulate the tip of a calligraphy pen. Pen tip instances may also be of varying size, such that two consecutive pen tip instances in the same set of ink may be of different sizes. Pen tip instances may further be of varying shape, such that two consecutive pen tip instances in the same set of ink may be of different shapes. Pen tip instances may further be of varying rotation, such that two consecutive pen tip instances in the same set of ink may be rotated at different angles. Of course, where the pen tip instance is an exact circle, the angle of rotation is meaningless. The rotation of a pen tip instance is also considered a property of each pen tip position and/or the entire stroke. To account for these potential variations in pen tip instance characteristics, another exemplary ink rendering system 1000 is shown in FIG. 10. The ink rendering system 1000 includes, or is coupled to, a pen device 1000 that feeds the (x, y) coordinates of the pen tip to a contour generator 1002. The pen device 1000 may also feed the pen tip instance size and/or rotation (e.g., angle) for each pen tip instance. The contour generator 1002 may be configured to generate a contour defining the outline of the pen tip instance based on the information provided by the pen device 1000, as well as information about the particular pen tip instance shape selected. Alternatively, there may be a plurality of contour generators 1002 each specializing in a different shape or family of shapes. For example, there may be a first contour generator that is configured to generate contours for circular pen tip instances and a second contour generator that is configured to generate contours for rectangular (including square) pen tip instances.

The contour generator 1002 (or another specialized contour generator) may also generate contours that define the shape of the connecting quadrangles, based on the received and utilized pen tip instance characteristics and positions. The contour generator 1002 may then send the generated contours to a graphics toolbox 1004. Where the ink is transparent, the contour generator 1002 may communicated with the graphics toolbox 1004 via a rendering environment 1003, and the method of FIG. 6 may be implemented. The graphics toolbox 1004 may fill or freeze the provided contours as appropriate and then output pixel values to an output device 1005 such as the monitor 407.

Figure 11:
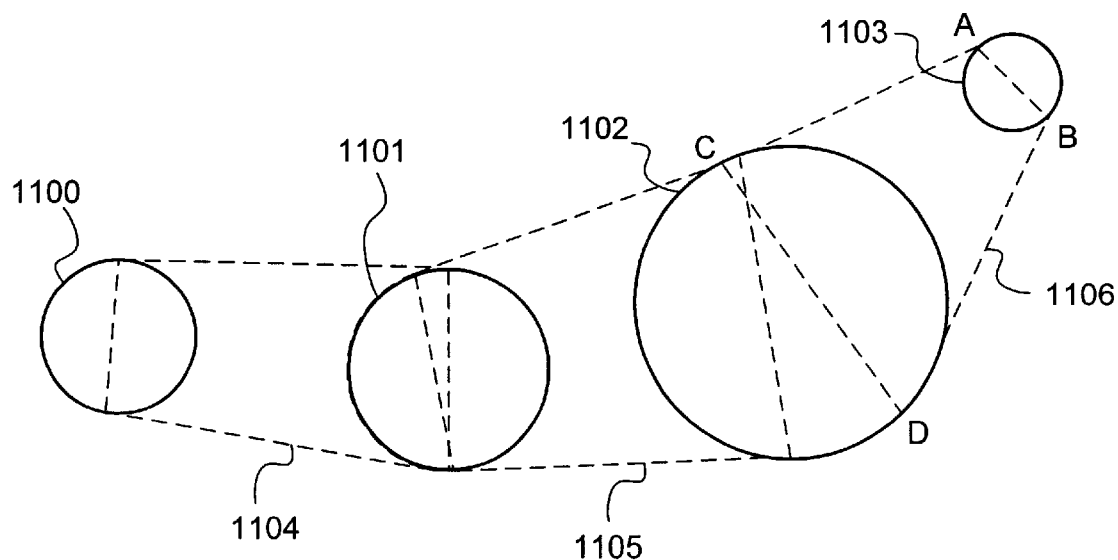
FIG. 11 is an exemplary geometrical representation of a stroke including differently-sized circular pen tip instances and connecting quadrangles according to at least one aspect of the present invention.
Figure 12:
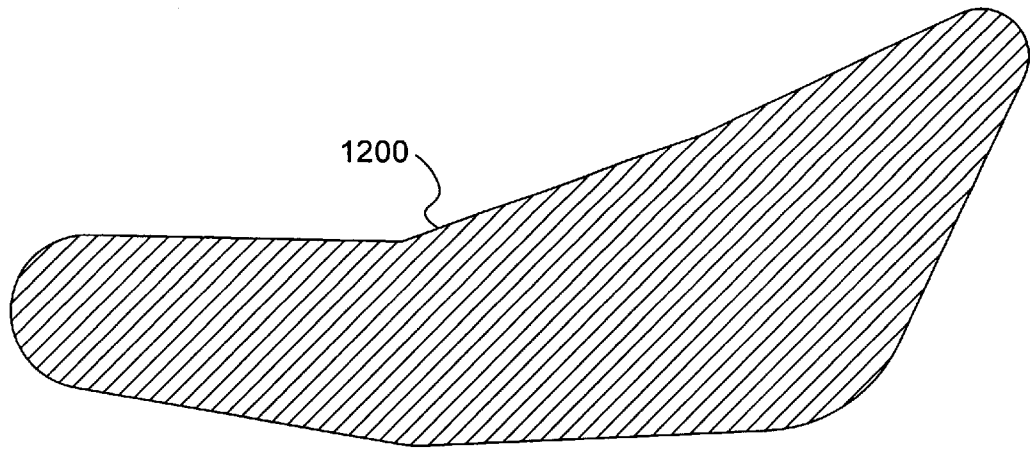
FIG. 12 is an exemplary embodiment of digital ink corresponding to the stroke of FIG. 11 as it may be displayed, according to at least one aspect of the present invention.

Referring to FIG. 11, an exemplary ink stroke has four pen tip instances 1100, 1101, 1102, 1103 of different sizes. Since the pen tip instances are circular, rotation is less important in this example and will be ignored in the present example. As this ink stroke was drawn, the size of the pen tip instances changed from medium (pen tip instance 1100), to larger (pen tip instances 1101, 1102), and then smaller (pen tip instance 1103). The size, rotation, and/or pen tip shape may be adjusted automatically by a software application running on the computer 400 and/or by the user. For example, the user may have pressed then stylus/pen 466 down against the digitizer 466 with additional pressure, or may have moved the stylus/pen 466 more slowly, to select larger pen tip instances. Or the user may physically rotate the pen along its longitudinal axis in order to obtain different rotated pen tip instances. The connecting quadrangles for different-sized circular pen tip instances are, in some embodiments, generated by determining tangential lines (e.g., lines AC and BD in FIG. 11) between the pen tip instances and then connecting those lines at the tangents with connecting chords (e.g., chords AB, CD in FIG. 11).

Figure 13:
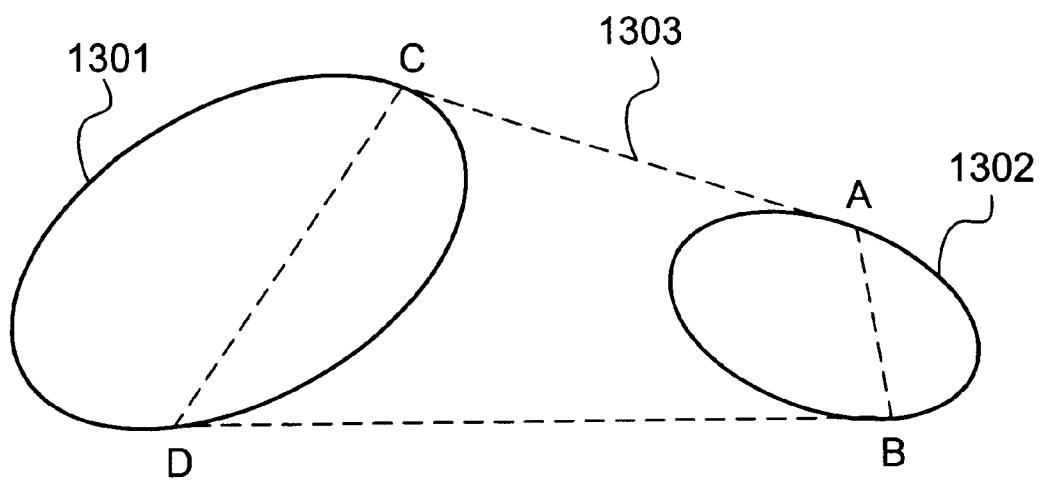
FIG. 13 is an exemplary geometrical representation of a stroke including differently-sized and differently-angled oval pen tip instances and a connecting quadrangle according to at least one aspect of the present invention.
Figure 14:
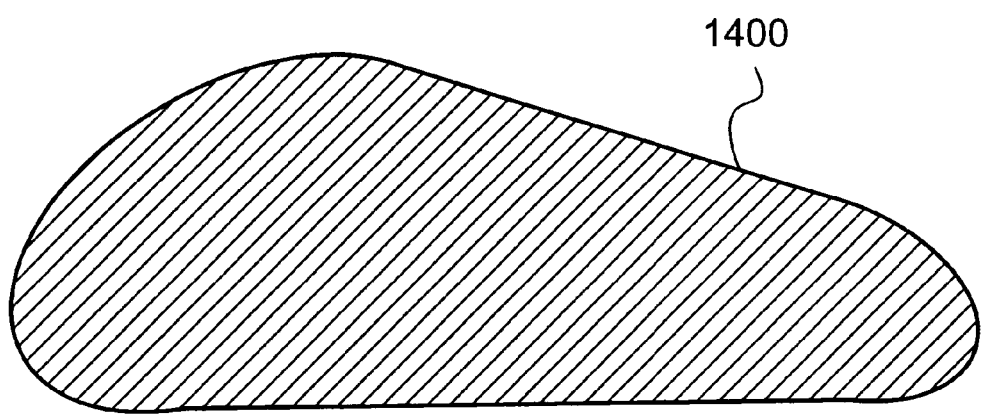
FIG. 14 is an exemplary embodiment of digital ink corresponding to the stroke of FIG. 13 as it may be displayed, according to at least one aspect of the present invention.

Referring to FIG. 13, the same method may be used as in FIG. 11 for determining connecting quadrangles (or other shapes). An exemplary ink stroke may include oval pen tip instances 1301, 1302. The connecting quadrangle may, in one example, be determined by calculating the lines that run tangent between the two ovals. In this case, those tangential lines would be lines AC and BD in FIG. 13. The tangential lines would then be closed by connecting their endpoints at the tangents with lines AB, CD. Note that although these ovals are of different rotational angles, the rotation does not matter for ovals when determining the connecting quadrangles.

Figure 15:
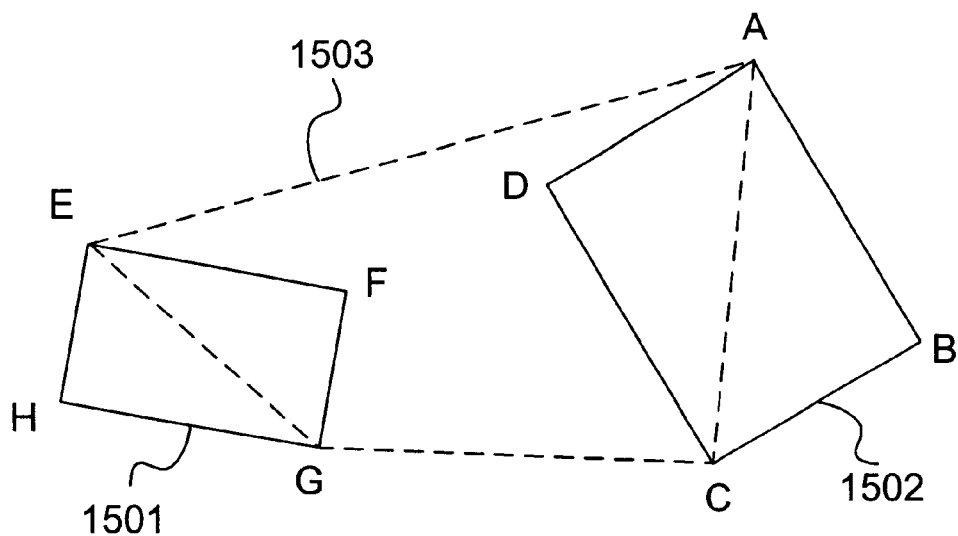
FIG. 15 is an exemplary geometrical representation of a stroke including differently-sized and differently-angled rectangular pen tip instances and a connecting quadrangle according to at least one aspect of the present invention.
Figure 16:
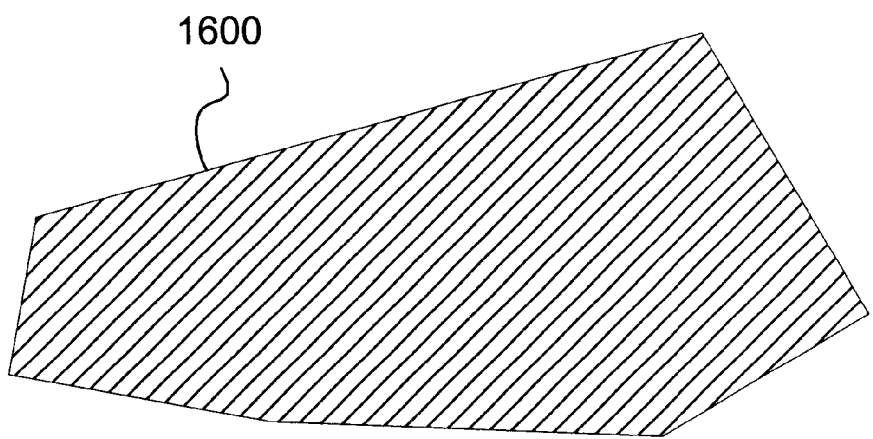
FIG. 16 is an exemplary embodiment of digital ink corresponding to the stroke of FIG. 15 as it may be displayed, according to at least one aspect of the present invention.
Figure 17A:
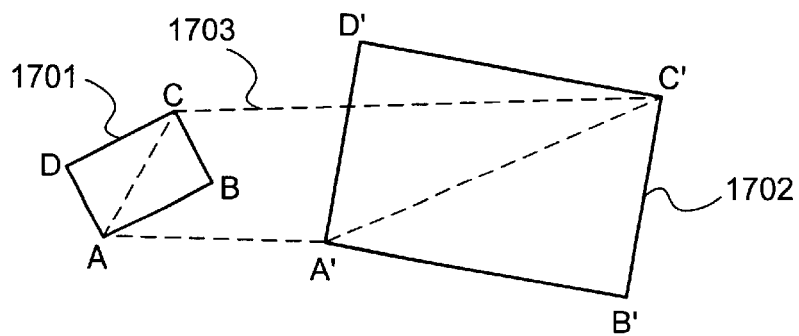
FIGS. 17A and 17B are exemplary geometrical representations of a stroke including differently-sized and differently-angled rectangular pen tip instances and two different possible connecting quadrangles according to at least one aspect of the present invention.
Figure 17B:
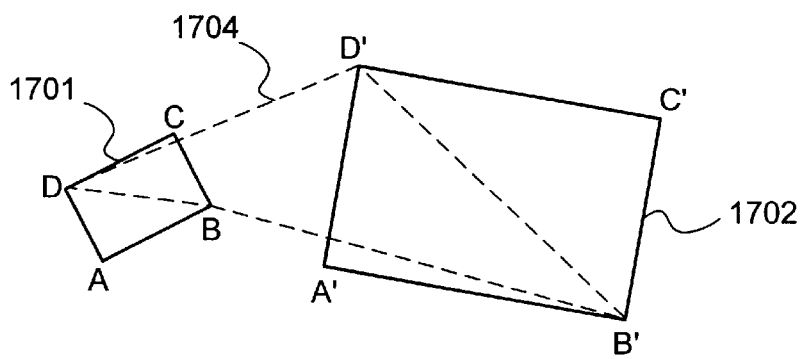

Next in FIG. 15 is shown an exemplary embodiment of a connecting quadrangle between two rectangular pen tip instances 1501, 1502, each having a different size and rotation. Although there are many possible connecting quadrangles, in this example, a connecting quadrangle 1503 connects corners A and E, corners A and C, corners C and G, and corners G and E. Another connecting quadrangle that could be used would connect corners A and H, corners D and F, corners B and G, and corners C and H. Another example is shown in FIGS. 17A and 17B, showing two different connecting quadrangles 1703, 1704 that could be used to connect two pen tip instances 1701, 1702. Connecting quadrangle 1703 connects corners A and A', corners C and C', corners A and C, and corners A' and C'. Connecting quadrangle 1704 connects corners B and B', corners D and D', corners B and D, and corners B' and D'.

Figure 17C:
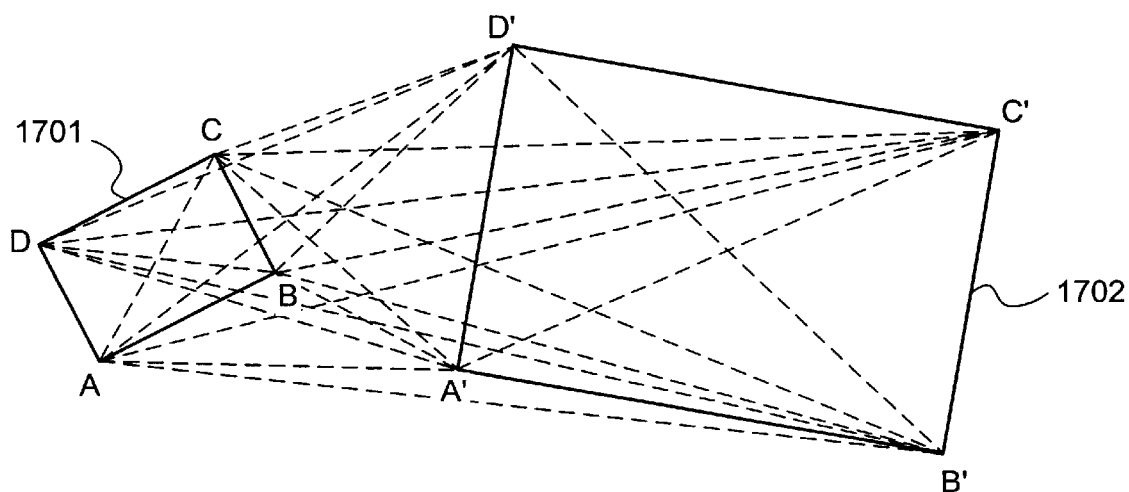
FIG. 17C is an exemplary representation of the stroke of FIGS. 17A and 17B including all of the possible corner-connecting quadrangles according to at least one aspect of the present invention.
Figure 18:
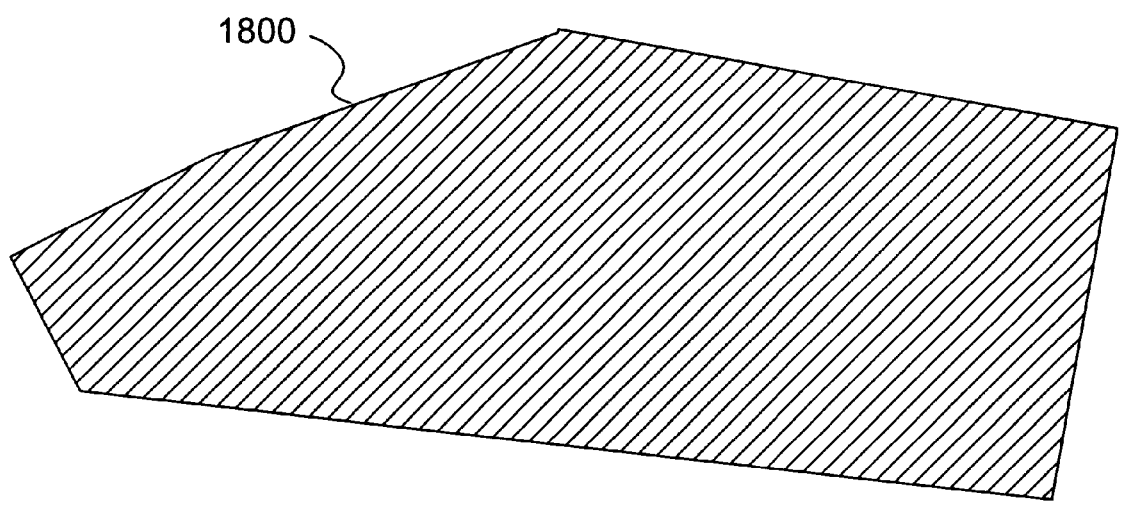
FIG. 18 is an exemplary embodiment of digital ink corresponding to the stroke of FIG. 17C as it may be displayed, including all possible connecting quadrangles, according to at least one aspect of the present invention.

It may be desirable to utilize a connecting quadrangle that connects between the outermost portions of the two pen tip instances to be connected. For instance, where the two pen tip instances are both polygons (i.e., closed shapes having only straight edges connected at corners), it may be desirable to connect the outermost corners together to provide for the largest area possible covered by the connecting quadrangle. Such an embodiment may in many cases provide a very smooth transition between pen tip instances and a higher-quality ink that is pleasing to the eye. Also, some or all of the possible connecting quadrangles (or a subset thereof) may be determined, and the determined quadrangles may be combined together (e.g., by taking their collective union) into a single connecting region. For example, referring to FIG. 17C, all of the possible connecting quadrangles that connect the corners of the pen tip instances 1701, 1702 are shown. A result of this is that every corner of pen tip instance 1701 is connected to every corner of pen tip instance 1702 via an edge of at least one of the connecting quadrangles. This method may be extended to any polygon having any number of sides and corners. FIG. 18 illustrates the resulting ink when all of the connecting quadrangles of FIG. 17C are combined together.

FIGS. 8, 12, 14, 16, and 18 illustrate the rendered ink that corresponds to the pen tip instances and connecting quadrangles in FIGS. 7, 11, 13, 15, and 17C respectively. The rendered ink in these figures is a result of using the rendering system 1000 as described.

Ink Smoothing

Figure 19:
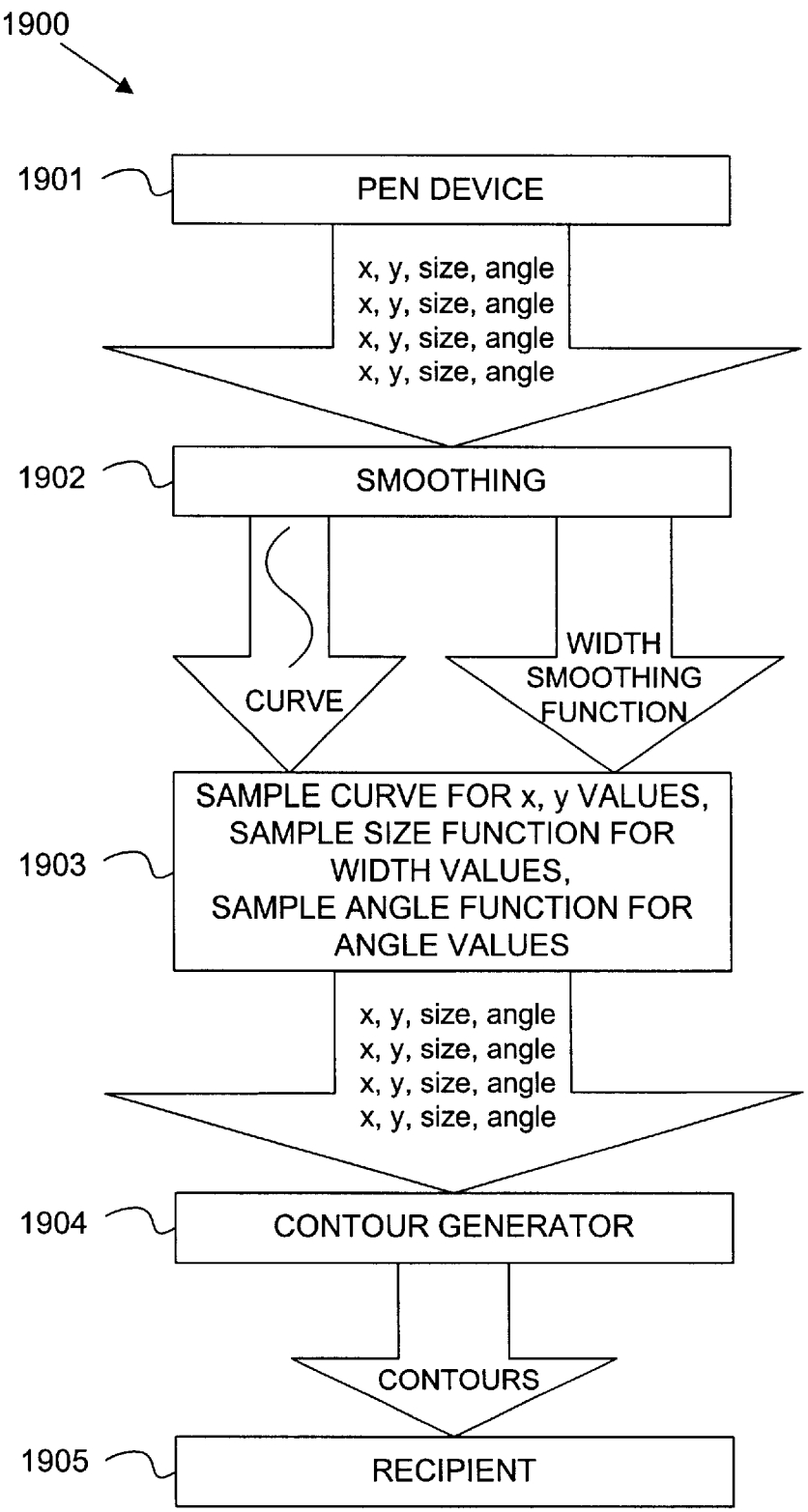
FIG. 19 is a functional block diagram of an exemplary embodiment of yet another ink rendering system according to at least one aspect of the present invention.

The ink-rendering process may also include smoothing the ink. Smoothing may be performed by the rendering system 500, 1000, such as by the graphics toolbox 503, 1004, using known smoothing functions. Another example of an ink rendering system 1900 is illustrated in FIG. 19. The ink rendering system 1900 includes a pen device 1901, a smoothing application or subroutine 1902, a curve-sampling application or subroutine 1903, a contour generator application or subroutine 1904, and/or a recipient 1905, which may be a graphics toolbox. In operation, the pen device 1901 (e.g., a digitizer and pen) may measure the pen's (x, y) location on the digitizer. The pen device 1901 may further determine the intended rotation angle and/or size of the pen tip. The smoothing application 1902 may receive a plurality of sampled pen tip positions, pen tip instance sizes, and/or angles of pen tip instance rotation and may smooth the position, size, and/or rotation amongst the plurality of pen samples. The curve-sampling algorithm 1902 may sample the smoothed (x, y) curve, the smoothed size function, and/or the smoothed rotation function and may output samples of these smoothed functions to the contour generator 1904. The contour generator 1904 may then generate the desired contours such as the pen tip instances and/or the connecting quadrangles, and forward these contours on to the recipient 1905.

Smoothing may be performed on the size and/or rotation parameters. The rendering system 1900 may use any smoothing technique such as least squares fitting. To smooth ink, samples of the ink may need to be taken. These samples may be taken anywhere along the ink stroke, but at least one sampling technique is to sample the locations that were originally sampled from the pen (i.e., the sampled pen tip locations).

An exemplary smoothing function may be implemented by the ink rendering system 1900 (more particularly, by, e.g., the smoothing application 1902) as follows for each sample along the ink stroke:

$$(\text{smoothed width})_i = A_1 * (\text{original width})_{i-1} + A_2 * (\text{original width})_i + A_3 * (\text{original width})_{i+1}, \quad (1)$$

where $A_1$, $A_2$, and $A_3$ are constants that may be chosen as desired, i is the sample number along the sampled ink stroke, "smoothed width" is the width of the ink stroke at sample i after smoothing, and "original width" is the width of the ink stroke at sample i before smoothing. In some examples, the sum of these three constants should equal unity. A combination of $A_1=0.25$, $A_2=0.5$, and $A_3=0.25$ works well. Angle of rotation can also be smoothed using any of the method for smoothing width, including substituting "smoothed width" and "original width" in equation 1 with "smoothed angle" and "original angle," respectively. In another embodiment, both size and angle may be smoothed for the same ink stroke.

Figure 20:
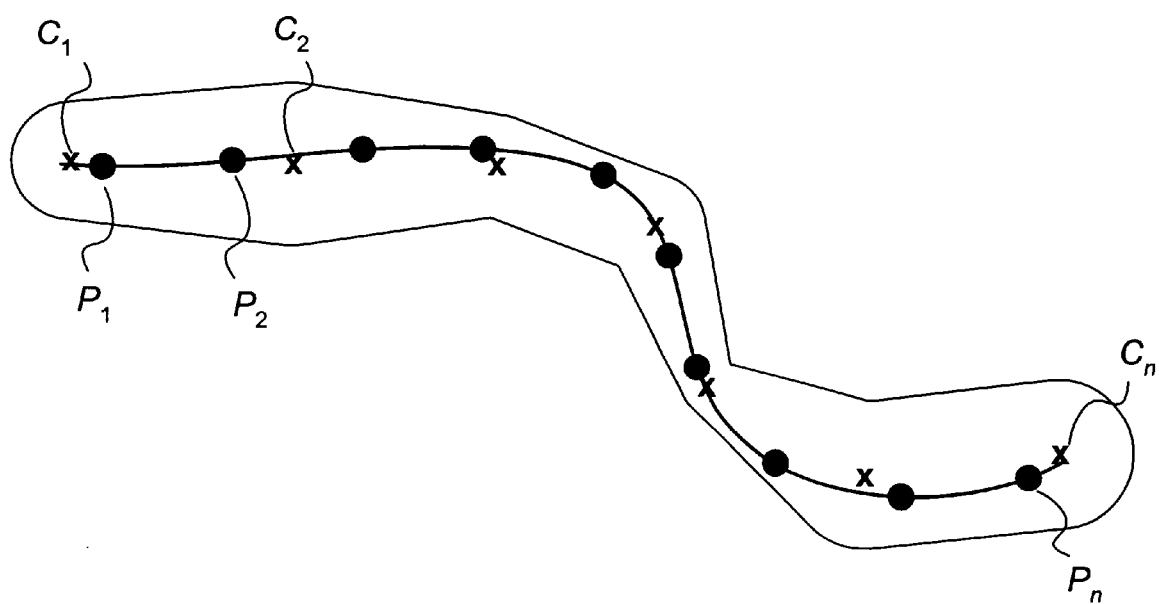
FIG. 20 is a geometric representation of an exemplary ink stroke illustrating the sample points therein as well as a fitting curve for position, width, and rotation, in accordance with at least one aspect of the present invention.

Referring to FIG. 20, an exemplary ink stroke is shown having sampled points $C_1$ through $C_n$ (each denoted with an "x"). Each sampled point C also has an associated size and/or rotation. Size, or width, at sample point $C_i$ will be denoted as $W_i$, and its associated rotation will be denoted as $R_i$. It may be desirable to smooth the sampled ink as to the (x, y) positions of the sample points, the size or width of the sampled points, and/or the rotation of the sampled points.

For example, using a least-squares method for smoothing, the following algorithm may be used such that the fitting curve P minimizes the following:

$$\min \sum \{a(C_i - P_i)^2 + b[W(C_i) - W(P_i)]^2 + c[R(C_i) - R(P_i)]^2\}, \quad (2)$$

where a, b, and c are optional weighting constants; $P_i$ are the locations of the points on the fitting curve P; $W(P_i)$ are the sizes/widths for each point $P_i$; and $R(P_i)$ are rotations for each point $P_i$. The fitting curve P may be any curve desired, such as one chosen from the family of parametric or Bezier curves. In effect, width/size and/or rotation are treated as additional dimensions other than position. Any subcombination of the dimensions in fitting a curve may also be used. For example, the third term $c[R(C_i)-R(P_i)]^2$ may be dropped from equation 2 so that rotation is not considered. Or, the second term $b[W(C_i)-W(P_i)]^2$ may be dropped from equation 2 so that width or size is not considered. Or, the first term $a(C_i-P_i)^2$ may be dropped from equation 2 so that sample position is not considered. Alternatively, both the first and second terms, or both the first and third terms, may be dropped from equation 2 so that only rotation or only width are considered in determining the fitting curve parameters.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. For example, while connecting quadrangles are discussed herein as a particularly advantageous shape, any shape of connecting regions other than quadrangular-shaped regions may be used. Also, while the above description discussed pen tip positions as being defined by (x, y) in a rectilinear coordinate system on the digitizer, any other coordinate system, such as polar, may be used.

What is claimed is:

1. A method for dynamically rendering a digital ink stroke, comprising the steps of:
   receiving a new pen tip instance;
   determining a first region based on the new pen tip instance;
   freezing a color of each of a plurality of pixels within a second region, the second region including a previous pen tip instance; and
   painting the first region while the color of the pixels within the second region is frozen.

2. The method of claim 1, wherein the color of the plurality of each of the pixels within the second region is transparent.

3. The method of claim 1, wherein the first region is the new pen tip instance.

4. The method of claim 1, wherein the step of determining the first region includes determining a quadrangle connecting the previous pen tip instance to the new pen tip instance.

5. The method of claim 4, wherein the first region comprises the quadrangle.

6. The method of claim 4, wherein the first region comprises both the quadrangle and the new pen tip instance.

7. The method of claim 4, wherein the new and previous pen tip instances are both one of a circle and an oval, the step of determining the quadrangle including determining the quadrangle to have two sides each tangent to both the new and previous pen tip instances.

8. The method of claim 4, wherein the new and previous pen tip instances are both rectangles, the step of determining the quadrangle including determining the quadrangle to have first and second corners each touching a different corner of the previous pen tip instance and third and fourth corners each touching a different corner of the new pen tip instance.

9. The method of claim 1, wherein the second region comprises a plurality of sub-regions stored in a queue, the method further comprising the step of pushing the first region into the queue.

10. The method of claim 9, further comprising the step of pushing at least one of the stored sub-regions, other than the first region, out of the queue.

11. The method of claim 1, further comprising the step of determining the second region by taking the union of a plurality of sub-regions including the previous pen tip instance.

12. The method of claim 1, wherein
   said painting the first region comprises applying a new color setting to a plurality of pixels that are within a third ink stroke region preceding the second region.

13. The method of claim 12, wherein the second region is a combined set of regions including at least one previous pen tip instance.

14. The method of claim 13, wherein the second region is a union of the set of regions.

15. A method for dynamically rendering a digital ink stroke, comprising the steps of:
   receiving a new pen tip position;
   determining a new pen tip instance based on the new pen tip position and a selected pen tip shape;
   determining a first region based on the new pen tip instance;
   sending a first command to a graphics toolbox to freeze a color of each of a plurality of pixels within a second region, the second region including a previous pen tip instance; and
   sending a second command to the graphics toolbox to paint the first region while the color of the pixels within the second region is frozen.

16. The method of claim 15, wherein the color of the plurality of each of the pixels within the second region is transparent.

17. The method of claim 15, wherein the first region is the new pen tip instance.

18. The method of claim 15, wherein the step of determining the first region includes determining a quadrangle connecting the previous pen tip instance to the new pen tip instance.

19. An apparatus for dynamically rendering a digital ink stroke, the apparatus coupled to a graphics toolbox, the apparatus comprising:

an ink storage configured to receive a new pen tip instance and to determine a first region based on the new pen tip instance; and a rendering environment coupled to the ink storage and configured to determine a second region including a previous pen tip instance, to command the graphics toolbox to freeze a color of each of a plurality of pixels within the second region, and to command the graphics toolbox to paint the first region while the color of the pixels within the second region is frozen.

20. An apparatus for dynamically rendering a digital ink stroke, comprising:

a computer configured to receive a new pen tip instance, to determine a first region based on the new pen tip instance, and to determine a second region including a previous pen tip instance; and a graphics toolbox coupled to the computer and configured to freeze a color of a plurality of pixels in the second region and to paint the first region.

21. The apparatus of claim 20, wherein the color of the plurality of pixels in the second region is transparent.

22. The apparatus of claim 20, wherein the graphics toolbox is a part of the computer.

23. The apparatus of claim 20, wherein the computer is further configured to determine a quadrangle connecting the previous and new pen tip instances.

24. The apparatus of claim 23, wherein the first region includes the quadrangle.

* * * * *